UNITED STATES PATENT OFFICE.

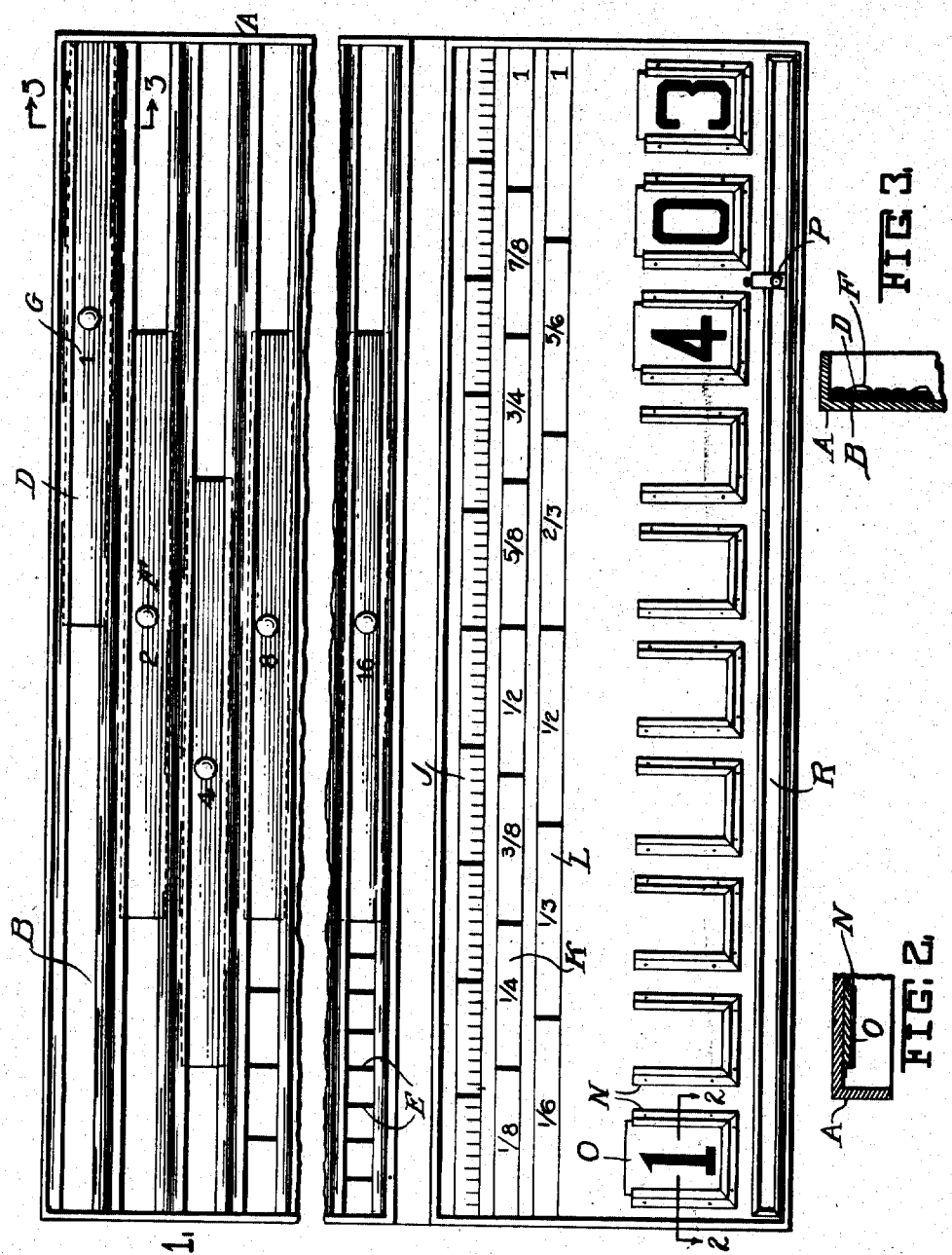

JOHN F. McGRATH, OF DORCHESTER, MASSACHUSETTS.

EDUCATIONAL APPLIANCE.

1,275,955.

Specification of Letters Patent.　Patented Aug. 13, 1918.

Application filed December 26, 1916.　Serial No. 138,706.

*To all whom it may concern:*

Be it known that I, JOHN F. MCGRATH, a citizen of the United States, residing at Dorchester, county of Suffolk, Commonwealth of Massachusetts, have invented certain new and useful Improvements in Educational Appliances, of which the following is a specification.

This invention relates to educational appliances, and particularly to a device for and method of teaching common and decimal fractions. The instruction of children in any subject is facilitated and the value of the instruction increased if the subject is capable of graphic illustration and if this illustration be presented in an interesting and attractive form. The teaching of common and decimal fractions while capable of illustration, and while usually taught by illustration, has usually been taught either at the blackboard, or by distributing familiar objects divided into a few of their fractional parts.

The possibilities of such instruction are therefore limited by the physical limitations of the blackboard or the illustrative exhibits, as the case may be, and by the particular ability of the individual instructor. The subject is difficult of graphic illustration with either of these methods, and while some little enterprise and ingenuity has been displayed by individual instructors either in the sketching of familiar objects and a few of their fractional parts upon a blackboard, or in the devising of appropriate physical exhibits, such instruction at best has been limited by the particular ability of the individual instructor and has always been incompletely adequate.

The object of my invention is to provide a device and method of teaching fractions combining the features of blackboard instruction and instruction by physical exhibits, but relieved of the numerous objections to both methods of instruction, whereby the science of common and decimal fractions and their relation to each other may be graphically and attractively visualized for the pupil, and by the use of which device the pupil's interest is not only created and retained, but is developed in such a way as to make an increased interest in this branch of education.

My device and method eliminates to a considerable degree the personal equation and not only affords a novel complete instruction in this subject, but also provides for more convenient and rapid instruction.

In carrying out my invention, I provide a plurality of comparable unit members, each with a different fractional or decimal scaling and preferably, by slide or other cover, capable of being blanked or exposed in whole or in part to facilitate or compel visual comparison.

This may be conveniently done by providing slides working in slideways across spaces having the suitable indications. These indications are related to each other in terms of a unit and the more usual of its fractions, and by moving the slides relatively, proportionate fractions of the whole may be exposed, thus enabling the pupil to visualize the relation of the parts of a unit to the unit itself.

The construction and manner of using my device is fully disclosed in the specification which follows, illustrated in the accompanying drawings and particularly defined in the appended claims. Throughout the specification and drawings like reference characters are correspondingly employed, and in these drawings:

Figure 1 is an elevation of my device, and

Figs. 2 and 3 are detail sections on the lines 2—2, and 3—3, respectively.

My device consists of a frame A provided longitudinally thereof between its end members with a plurality of channel members B defining spaced slideways in which work slides D. These slides are preferably of a length equal to substantially one-half the total length of the slideways and are all of uniform length. In order to more clearly present the intended instruction the slideways and slides are given contrasting colors. A convenient method of differentiating the slides and slideways as well as portions of the slideways themselves is to color white that portion of the slideways to the left of the transverse median line of the frame, and to provide said area with black indications E representing fractions of a unit, and to color black both the other half of the slideways and the slides. Obviously, however, the slides and slideways may be otherwise distinguished.

Each slide is provided with an operating portion F here shown as a cup-like projection drawn up out of the stock of the slide, whereby the slides may be moved in their slideways. The slides preferably bear numbers G indicating their fractional relation to the unit, as halves, thirds, fourths, etc., as plainly shown in the drawings.

The uppermost slide, as here shown, represents a unit and when moved from the right until it abuts the end member of the frame A at the left covers one-half of its slideway and graphically illustrates the unit or integer. The other slides are adapted to be similarly adjusted, relative to the corresponding fractional indications E of the slideways according to their fractional values G to thus visually reproduce fractional parts of the unit.

The progression to the decimal system and the relation to fractions is effected by a scale J indicating as here shown a unit graduated into hundredths, and preferably coextensive therewith are other scales K and L, indicating as here shown, halves, eighths, quarters, sixths and thirds, in terms of their decimal equivalents.

Below the series of scales, I provide a longitudinal series of card holders N, of any desired construction, and adapted to contain cards O bearing suitable integers. The cards are adapted to be removed and interchanged in their holders to form various whole numbers, and these numbers are adapted to be pointed off into decimals by a movable decimal point P which as here shown slides in a way R arranged below and coextensive with the series of cards.

Various modifications in the form and construction of my device as well as the nature and character of the subject matter may obviously be resorted to if within the limits of the appended claims.

What I therefore claim and desire to secure by Letters Patent is:

1. In a device of the class described, a plurality of contiguous elements provided with different graduations, and selectively exposable to afford comparison of equivalent portions of said elements.

2. In a device of the class described, a plurality of contiguous elements provided with different fractional graduations, and selectively exposable to afford comparison of equivalent portions of said elements.

3. In a device of the class described, a plurality of contiguous elements provided with different divisional graduations in that area to one side of the transverse median line, and means of a length substantially equivalent to the length of the graduated area and constituting a unit movable to expose equivalent portions of said elements.

4. In a device of the class described, a frame having a plurality of slideways including areas of indication denoting fractional parts of a unit, and a plurality of independently adjustable slides representing a unit adapted to coöperate with said indications to visually indicate the relation of fractional parts of a unit to the unit.

5. In a device of the class described, a frame having a plurality of slideways including areas of indication denoting fractional parts of a unit, and a plurality of independently adjustable slides representing a unit of a length equal to substantially half the length of the slideways and adapted to coöperate with said indications to visually indicate the relation of fractional parts of a unit to the unit.

6. In a device of the class described, a frame having a plurality of slideways including areas of indication denoting fractional parts of a unit, and a plurality of independently adjustable slides representing a unit of a length equal to substantially half the length of the slideways and adapted to coöperate with said indications to visually indicate the relation of fractional parts of a unit to the unit, said slides and slideways contrastingly colored to assist observation.

7. In a device of the class described, a plurality of contiguous elements each provided with divisional graduations in that area to one side of the transverse median line, and a slide for each of said graduated elements of a length substantially equivalent to the length of the graduated area and a slideway for each of said graduated elements for guiding said slides to expose equivalent graduated portions of said elements.

8. In an educational appliance, a plurality of contiguous elements provided with different divisional graduations, and means constituting units for comparably exposing equivalent graduated portions of said elements.

In testimony whereof I affix my signature in presence of two witnesses.

JOHN F. McGRATH.

Witnessses:
MARY P. WOTHERSPOON,
MARION F. WEISS.

Copies of this patent may be obtained for five cents each, by addressing the "Commissioner of Patents, Washington, D. C."